Oct. 4, 1949.   J. E. PETERSON   2,483,560
BEARING AND SPACING GUIDE MEMBER FOR
GLASS BLOCK CONSTRUCTION
Filed May 29, 1947   2 Sheets-Sheet 1
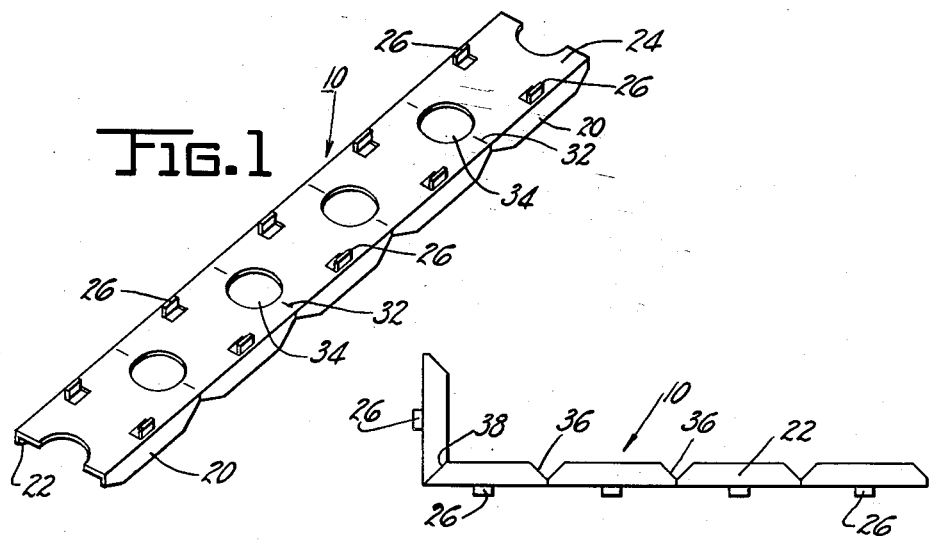
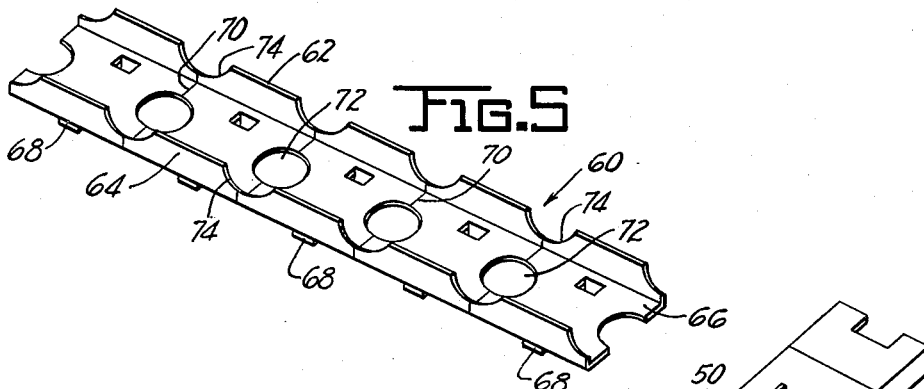
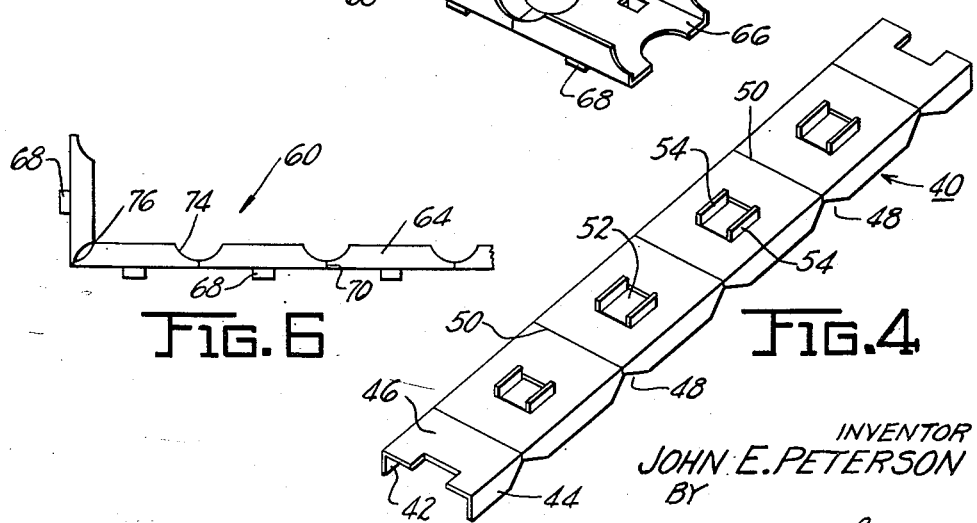
INVENTOR
JOHN E. PETERSON
BY
Richard C. Lindberg
ATTORNEY Oct. 4, 1949.  J. E. PETERSON  2,483,560
BEARING AND SPACING GUIDE MEMBER FOR
GLASS BLOCK CONSTRUCTION
Filed May 29, 1947  2 Sheets-Sheet 2
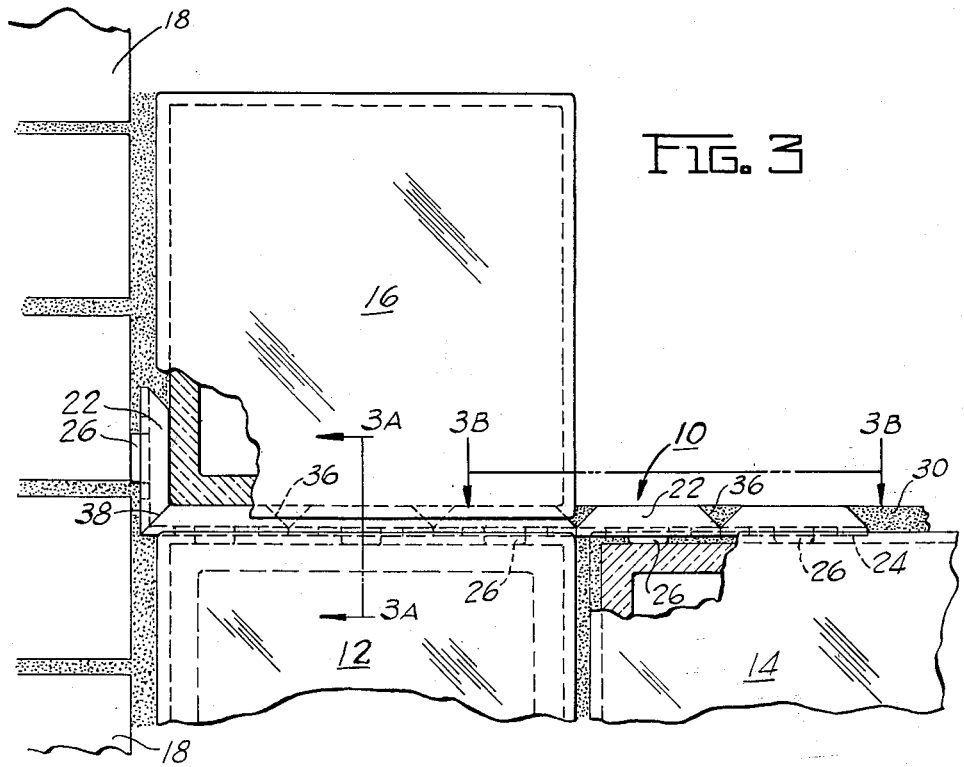
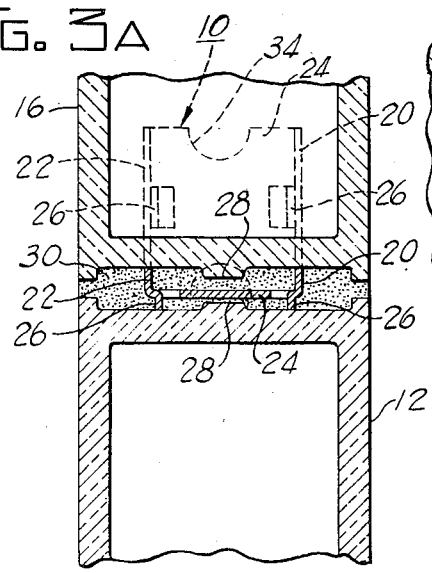
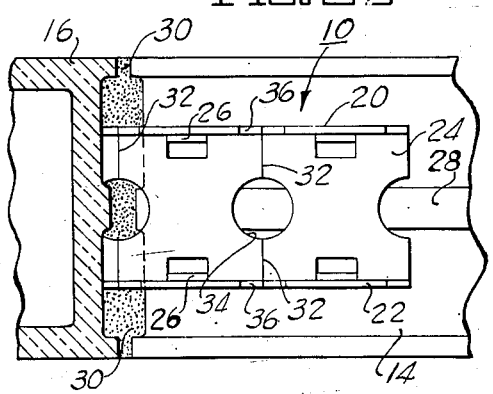
INVENTOR
JOHN E. PETERSON
BY
Richard C. Lindberg
ATTORNEY Patented Oct. 4, 1949

2,483,560

UNITED STATES PATENT OFFICE 2,483,560

BEARING AND SPACING GUIDE MEMBER FOR GLASS BLOCK CONSTRUCTION

John E. Peterson, Chicago, Ill., assignor to Glass Block Spacer Guide, Inc., Chicago, Ill.

Application May 29, 1947, Serial No. 751,190

4 Claims. (Cl. 72—107)

This invention relates to improvements in masonry wall construction, particularly glass block walls, and has particular reference to devices for insuring the proper thickness of mortar joints and for insuring that courses in such a wall do not become misaligned while the mortar joints are setting up.

Modern construction often times calls for walls composed of glass blocks which are laid in mortar beds. These blocks are non-absorbent, and as a result the mortar joints do not set up rapidly as would mortar joints between absorbent bricks. In view of the fact that the joints in glass block construction do not set up rapidly, after a number of courses have been laid the weight of the blocks squeezes out the mortar in the lowest courses, and the blocks no longer remain in straight, true horizontal alignment.

One of the objects of this invention is to provide a bearing member and spacing guide for glass block masonry construction which will enable a mason to lay up a large number of courses without the possibility of the blocks squeezing out the mortar between courses.

Another object is to provide a member which will correctly gauge the thickness of the mortar joints and which will not impair the bond between the blocks nor impair the efficiency of the joint in any way.

Still another object is to provide a member which may be easily fabricated from sheet material by a series of simple punching operations, and which may easily be separated into convenient lengths for use.

Yet another object is to provide a bearing member and spacing guide which may be used to support glass blocks one upon the other in courses held together by mortar joints while the mortar is undergoing setting, which member may also be used for maintaining the proper thickness of the vertical joints.

A yet further object is to provide a bearing member and spacing guide which is provided with planes of weakness which make it easy to separate the member into convenient lengths, and which permits the member to be bent into L-shaped portions whereby the upstanding leg will provide a spacing guide for the vertical joints.

Another object is to provide a member for the uses recited having flanges with notches therein, the notches being so shaped that when points therein come into contact upon bending of the member the corner so formed will be a right angle.

Other objects of the invention will be apparent from a study of the description hereinafter taken together with the drawings in which:

Figure 1 is an isometric view of one form the invention may assume in practice;

Figure 2 is an elevation view of Figure 1, with a portion of the member bent to provide an upstanding leg for vertical joint spacing;

Figure 3 is a front elevation view showing a masonry and glass wall with the bearing member and spacing guide of Figures 1 and 2 in position;

Figure 3A is a section taken through the glass block panel shown in Figure 3 along the line 3A—3A looking in the direction of the arrows;

Figure 3B is a partly plan and partly sectional view taken along the line 3B—3B of Figure 3 and looking in the direction of the arrows;

Figure 4 is an isometric view of another embodiment of the invention;

Figure 5 is an isometric view of still another embodiment of the invention; and

Figure 6 is an elevation view of Figure 5.

Referring now to Figures 1 to 3B inclusive, the bearing member and spacing guide according to the present invention is indicated generally by the ordinal 10, and is shown (Figure 3) as resting on glass blocks 12 and 14 forming part of a course, and supporting glass block 16 part of a successive course. The glass blocks 12, 14 and 16 may form a panel or window in a brick wall indicated by the ordinal 18.

The bearing member and spacing guide 10 consists of a pair of spaced flanges 20 and 22 connected by a web 24. The web 24 has extending therefrom lugs 26 which are preferably punched from the web 24 and which are spaced both longitudinally and transversely of the web 24. The lateral spacing of the lugs 26 is desirable to provide stability against tipping of the block supported by the bearing member and spacing guide 10 and for the member and guide to straddle a bead or joining line 28 where each half of the block is joined in manufacturing.

It will be apparent from the description thus far that the guide and member 10 may be placed on the blocks 12 and 14, the lugs 26 resting on the blocks 12 and 14 and straddling their joining line, and member and guide 10 then covered with mortar 30 and the block 16 then placed on guide 10. It will also be apparent that successive courses of glass blocks may be laid and that by means of the guide 10, the successive courses will remain in true horizontal alignment in spite of the inability of the mortar to support successive courses of blocks until it has taken a set. It will also be apparent that the lugs 26 provide a series of bearing points along the top of a course of glass blocks, and that the upstanding flanges 22 form a series of discontinuous bearing points for a course of glass blocks adapted to rest upon the bearing member and spacer guide 10.

The bearing member and guide 10 may be conveniently separated into convenient lengths, and to this end the flanges 20 and 22 and the web 26 are provided with lines of weakness 32 which are spaced longitudinally of the guide 10 and preferably midway of the lugs 26.

In order to minimize any reduction in bond in the mortar joint 30 the web 24 is provided with spaced longitudinal preferably cylindrical openings 34 which may be bisected by the prolongations of the lines of weakness 34.

It is desirable at times to bend the member and guide 10 into an L-shape that it may also be used as a guide for the width of vertical joints. That this may conveniently be done the flanges 20 and 22 are formed with oppositely disposed notches 36 which embrace a central angle of 90°, the apex of which lies in the line of weakness 34 as shown in Figure 2, the member and guide may be bent in the form of an L with the sides of the notch 36 meeting as shown at 38, see also Figure 3.

Referring now to Figure 4, there is shown another embodiment of the invention indicated by the ordinal 40. This embodiment is similar to that shown in Figures 1 to 3 inclusive, consisting of spaced flanges 42 and 44 connected by a web 46. The flanges are notched at 48 across transverse line of weakness 50, and the member and guide 40 may be bent in similar fashion to the member and guide shown in Figure 2. Support for the member 40 on the course of glass block is achieved by providing rectangular shaped openings 52 in the web 46, which openings 52 are located midway between lines of weakness 50, and which are bent or punched to provide lugs 54.

Referring now to Figures 5 and 6, there is shown still another embodiment of the invention which is indicated by the ordinal 60. This embodiment is substantially like that shown in Figures 1 to 3 inclusive, and consists of spaced flanges 62 and 64 connected by a web 66. The web 66 has extending therefrom lugs 68 which are preferably punched from the marginal edges of the web 66, and which are spaced longitudinally and transversely of the web 66. Spaced longitudinally of the web and intermediate the lugs 68 are lines of weakness 70 which also extend into the flanges 62 and 64, and similarly spaced along the web 68 are substantially cylindrical openings 72 which may be bisected by prolongations of the lines of weakness 70.

As with the embodiment shown in Figures 1 to 3B inclusive, it may be desired to bend the member and guide 60 along the web 66 at the line of weakness 70 at right angles into the shape of an L that it may be used as a guide for the width of vertical joints. To this end the flanges 62 and 64 have substantially semi-cylindrical spaced cutout sectors 74 therein oppositely disposed from each other and bisected by the line of weakness 70. The cutout sectors 74 may include a central angle of 180° and when the member and guide 60 is bent as shown in Figure 6, diametrically opposite points on the sector 74 will touch as at 76 and the guide 60 will have been bent at the line of weakness 70 into a L-shaped member including an angle of 90°.

Thus has been described a new and different device for use in accurately constructing masonry walls, particularly walls made of glass block, which, since being non-absorbent, give problems in the construction thereof without the use of the devices constructed according to the present invention. The member and guide according to the present invention may conveniently be fabricated from light sheet metal, may be conveniently separated by the user into convenient lengths along the lines of weakness formed therein, and may be easily and simply adapted for a guide for vertical joint spacing in addition to use in horizontal joints. While the invention has been described in terms of several preferred embodiments thereof its scope is limited only in terms of the claims here appended.

I claim:

1. In a glass block panel construction, a channel-shaped bearing and spacing guide member adapted to be situated between adjacent courses of glass blocks, said member comprising upwardly extending flanges adapted to impinge against the bottom surface of an upper course of glass blocks and a web portion having longitudinally spaced cylindrical openings, oppositely disposed pairs of longitudinally spaced lugs intermediate said spaced cylindrical openings and extending downwardly from the marginal edges of said web portion in a direction opposite to said flanges and adapted to rest upon the upper surface of a lower course of glass blocks, said upwardly extending flanges having semi-cylindrical spaced cut out sectors oppositely disposed from each other and having the said cylindrical openings in the web portion therebetween, the axes of each pair of said cut out sectors being in a plane perpendicular to the plane containing the longitudinal axis of the web portion and coinciding with the transverse diameter of the intermediate cylindrical opening thus forming lines of weakness spaced at intervals for dividing said member into convenient lengths and for bending said member at right angles.

2. In a glass block panel construction, a channel-shaped bearing and spacing guide member adapted to be situated between adjacent courses of glass blocks, said member comprising upwardly extending flanges adapted to impinge against the bottom surface of an upper course of glass blocks and a web portion having longitudinally spaced cylindrical openings, oppositely disposed pairs of longitudinally spaced lugs intermediate said spaced cylindrical openings and extending downwardly from the marginal edges of said web portion in a direction opposite to said flanges and adapted to rest upon the upper surface of a lower course of glass blocks, said upwardly extending flanges having spaced cutout portions therein oppositely disposed from each other and having the said cylindrical openings in the web portion therebetween, each pair of said oppositely disposed cutout portions extending across a plane perpendicular to the plane containing the longitudinal axis of the web portion and coinciding with the transverse diameter of the intermediate cylindrical opening thus forming lines of weakness spaced at intervals for dividing said member into convenient lengths and for bending said member at right angles.

3. In a glass block panel construction, a channel-shaped bearing and spacing guide member adapted to be situated between adjacent courses of glass blocks, said member comprising upwardly extending flanges adapted to impinge against the bottom surface of an upper course of glass blocks and a web portion having longitudinally spaced apertures therein, oppositely disposed pairs of longitudinally spaced lugs intermediate said spaced apertures and extending downwardly from the marginal edges of said web portion in a direction opposite to said flanges and adapted to rest upon the upper surface of a lower course of glass blocks, said upwardly extending flanges having spaced cutout portions therein oppositely disposed from each other and having the said apertures in the web portion therebetween, each pair of said oppositely disposed cutout portions extending across a plane perpendicular to the longitudinal axis of said web and perpendicular to the plane of said web and extending across said aperture thus forming lines of weakness spaced at intervals for dividing said member into convenient lengths and for bending said member at right angles.

4. In a glass block panel construction, a channel-shaped bearing and spacing guide member adapted to be situated between adjacent courses of glass blocks, said member comprising upwardly extending flanges adapted to impinge against the bottom surface of an upper course of glass blocks and a web portion having longitudinally spaced apertures therein, oppositely disposed pairs of longitudinally spaced lugs intermediate said spaced apertures and extending downwardly from the marginal edges of said web portion in a direction opposite to said flanges and adapted to rest upon the upper surface of a lower course of glass blocks, said upwardly extending flanges having semi-cylindrical spaced cutout sectors oppositely disposed from each other and having the said apertures in the web portion therebetween, the axes of each pair of said cutout sectors being in a plane extending across the aperture therebetween and perpendicular to the plane containing the longitudinal axis of the web portion thus forming lines of weakness spaced at intervals for dividing said member into convenient lengths and for bending said member at right angles.

JOHN E. PETERSON.

REFERENCES CITED

The following references are of record in the file of this patent:

UNITED STATES PATENTS

| Number | Name | Date |
|---|---|---|
| 641,067 | Blazo | Jan. 9, 1900 |
| 863,786 | Curlett | Aug. 20, 1907 |
| 1,854,314 | Ryan | Apr. 19, 1932 |
| 2,229,869 | Koch | Jan. 28, 1941 |
| 2,241,266 | Mayne et al. | May 6, 1941 |